No. 892,188. PATENTED JUNE 30, 1908.
B. SCHWERIN.
PROCESS FOR SEPARATING AND SIMULTANEOUSLY EXTRACTING WATER FROM MINERAL, VEGETABLE, AND ANIMAL SUBSTANCES.
APPLICATION FILED APR. 30, 1907.
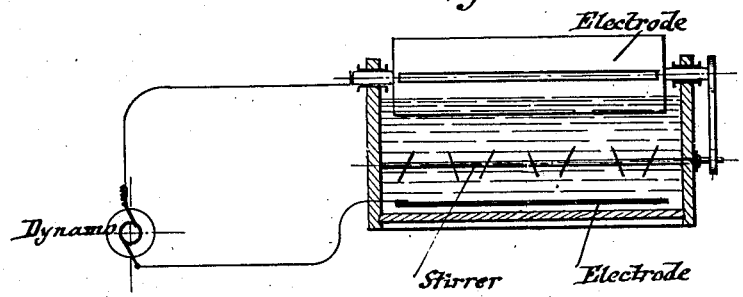
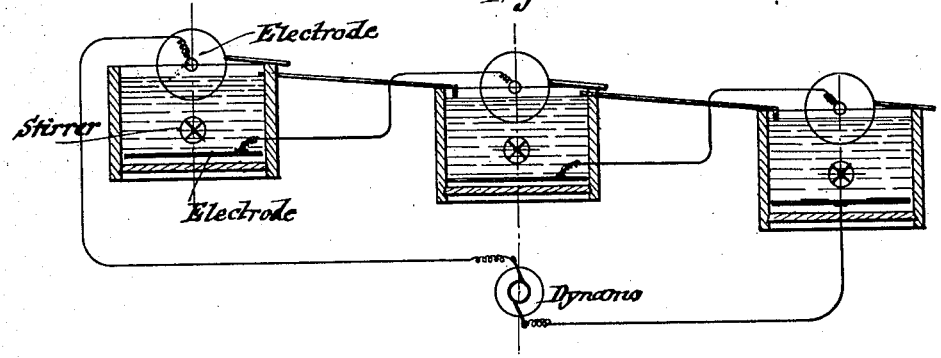
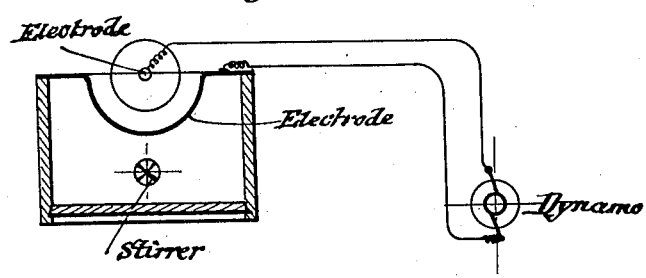

UNITED STATES PATENT OFFICE.

BOTHO SCHWERIN, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS FOR SEPARATING AND SIMULTANEOUSLY EXTRACTING WATER FROM MINERAL, VEGETABLE, AND ANIMAL SUBSTANCES.

No. 892,188.     Specification of Letters Patent.     Patented June 30, 1908.

Application filed April 30, 1907. Serial No. 371,171.

*To all whom it may concern:*

Be it known that I, BOTHO SCHWERIN, doctor of laws and chemist, a citizen of the Empire of Germany, and residing at Frankfort-on-the-Main, Germany, have invented certain new and useful Improvements in Processes for Separating and Simultaneously Extracting Water from Mineral, Vegetable, and Animal Substances, of which the following is a specification.

I have found that in extracting water from mineral, vegetable and animal substances in the form of pastes or mud by means of electro-osmosis, which consists in causing the solid particles to deposit in a coherent form comparatively free from liquid on one electrode or on an intervening partition of pervious material and afterwards separating the particles mechanically from the remaining liquid, the various solid particles behave differently.

In a mixture of particles of a different nature, for instance of different individualities, such as sand, clay, chalk, or of particles of different physical properties, such as granular particles and colloidal particles, the particles are deposited more or less quickly at the electrode, or when they have no electro-osmotic properties, they do not deposit at the electrode at all. When, for instance, a mixture of sand and clay be subjected to the aforesaid process, the clay alone will deposit at the electrode, whereas the electro-osmotically indifferent sand remains in the liquid. If the clay contains coarse particles as well as very fine ones, the finest particles will deposit first and then the coarser ones. I make use of this property for separating the different particles from each other, while simultaneously eliminating the water.

In the accompanying drawings, Figure 1 represents a vertical transverse section of one form of apparatus for separating and extracting water from non-conducting substances, Fig. 2 is a vertical longitudinal section of another form of apparatus showing a series of tanks, and Fig. 3 is a vertical transverse section of a modified form of apparatus.

The process may be carried out, for instance, as follows: A metallic vessel, which serves itself as the electrode, generally the cathode towards which the water passes, contains the solid particles suspended in water. In this mixture, the other electrode is immersed and may be surrounded by an intervening partition or screen of pervious non-conducting material, as shown in Fig. 3, to avoid an electrolytical action on the solid particles. When the current is closed, the mixture is agitated by a rotary stirrer. The finest particles are deposited first at the anode or at the intervening partition in a condition comparatively free from water; the process is interrupted, when the fine particles have been deposited for the greater part, whereupon they are separated mechanically from the particles remaining in suspension in the water in the vessel. The water is then again subjected to electro-osmotic treatment and the coarser particles are deposited by this operation. The process may be continued until all particles, which travel electro-osmotically in the same direction, are removed. The electrodes may also be placed in a vessel or tank, as shown in Fig. 1, one at the bottom, the other being at the top and rotated by suitable mechanism. The process may also be carried out with advantage by causing the mixture to pass through a series of tanks in such a manner that only the finest particles are obtained in the first tank and the coarser particles in the subsequent tanks, as shown in Fig. 2.

It is known that it is best to carry out levigating methods in as diluted a suspension as possible, for in denser mixtures the coarser particles, like sand, retained in the dense fluid, cannot be deposited. In the case of dense mixtures, the process according to the invention, is conducted in a vessel of non-conducting material. The anode is arranged as aforesaid, whereas the cathode consists of wire-netting, or perforated sheet-metal or the like, surrounding the anode at a suitable distance. When the circuit is closed, and the mixture stirred, the solid particles which are outside the cathode must pass through the meshes or perforations of the cathode on their way to the anode. When the body which is to be separated deposits at the cathode, the electrodes are to be arranged in such a way that the cathode is surrounded by the perforated anode in the manner above described.

During the process the mixture in which the electrodes are submerged is stirred, whereby the solid particles gradually pass through the holes of the perforated electrode and arrive in the space between the two poles; on their way to this space the particles have to pass through the water surrounding the perforated electrode; they have to pass a zone, which always contains very few solid particles only, allowing the coarser particles to separate there from the finer ones. The process occurs otherwise exactly as described above.

Having thus described my invention, I claim as new and desire to secure by Letters Patent:

1. In an electrolytic process for separating and simultaneously extracting water from non-conducting vegetable, animal and mineral substances by means of electro-osmosis, the step of causing the suspended solid particles to be deposited fractionally.

2. In an electrolytic process for separating and simultaneously extracting water from non-conducting vegetable, animal and mineral substances by means of electro-osmosis, the step of causing the suspended solid particles to deposit fractionally on non-conducting pervious diaphragms placed before the electrode.

3. In an electrolytic process for separating and simultaneously extracting water from non-conducting vegetable, animal and mineral substances by means of electro-osmosis, the step of causing the suspended solid particles to deposit fractionally by passing the liquid containing said particles through a series of apparatus in which they are subjected to electro-osmosis.

4. In an electrolytic process for separating and simultaneously extracting water from non-conducting vegetable, animal and mineral substances by means of electro-osmosis, the step of causing the suspended solid particles to deposit fractionally on non-conducting pervious diaphragms placed before the electrodes and passing the liquid containing the suspended particles through a series of apparatus in which they are subjected to electro-osmosis.

5. In an electrolytic process for separating and simultaneously extracting water from non-conducting vegetable, animal and mineral substances by means of electro-osmosis, the step of causing the suspended solid particles to deposit fractionally by passing them on their way to the electrode, where they are to be separated and deposited, through the liquid retained at the other electrode.

6. In an electrolytic process for separating and simultaneously extracting water from non-conducting vegetable, animal and mineral substances by means of electro-osmosis, the step of causing the suspended solid particles to deposit fractionally on non-conducting pervious diaphragms placed before the electrode to which they are conducted by the electric current by passing them on their way to this electrode through the liquid retained at the other electrode.

7. In an electrolytic process for separating and simultaneously extracting water from non-conducting vegetable, animal and mineral substances by means of electro-osmosis, the step of causing the suspended solid particles to deposit fractionally by passing them on their way to the electrode, where they are to be separated and deposited, through the liquid retained at the other electrode in such a way that the electrode, which retains the water, being perforated, surrounds completely the other electrode as far as it is immersed into the liquid.

8. In an electrolytic process for separating and simultaneously extracting water from non-conducting vegetable, animal and mineral substances by means of electro-osmosis, the step of causing the suspended solid particles to deposit fractionally on non-conducting pervious diaphragms placed before the electrode, to which they are conducted by the electric current, by passing them on their way to the electrode, where they are to be separated and deposited, through the liquid retained at the other electrode in such a way that the electrode, which retains the water, being perforated, surrounds completely the other electrode as far as it is immersed into the liquid.

In testimony, that I claim the foregoing as my invention, I have signed my name in presence of two subscribing witnesses.

BOTHO SCHWERIN.

Witnesses:
JEAN GRUND,
CARL GRUND.